United States Patent [19]

Yokoyama et al.

[11] Patent Number: 4,534,243
[45] Date of Patent: Aug. 13, 1985

[54] HYDRAULIC CONTROL SYSTEM FOR A V-BELT TRANSMISSION

[75] Inventors: Shoji Yokoyama, Anjo; Shiro Sakakibara, Toyokawa, both of Japan

[73] Assignee: Aisin Warner Kabushiki Kaisha, Japan

[21] Appl. No.: 488,842

[22] Filed: Apr. 26, 1983

[51] Int. Cl.³ .................. B60K 41/14; F16H 55/52
[52] U.S. Cl. .................................. 74/868; 474/18; 474/28; 474/70
[58] Field of Search ............ 74/867, 868, 865, 752 C, 74/869; 474/18, 28, 70, 103, 104, 102

[56] References Cited

U.S. PATENT DOCUMENTS 3,115,049 12/1963 Moan .................. 474/18 X
4,419,910 12/1983 Miki et al. .................. 74/869 X

FOREIGN PATENT DOCUMENTS 63787 11/1982 European Pat. Off. .............. 74/867
57-37146 3/1982 Japan .................. 74/867
57-76351 4/1982 Japan .................. 74/867
57-137757 8/1982 Japan .
58-39876 3/1983 Japan .................. 74/867
2076084 11/1981 United Kingdom .................. 74/865

Primary Examiner—Allan D. Herrmann
Assistant Examiner—Stephen B. Andrews
Attorney, Agent, or Firm—Blum Kaplan Friedman Silberman & Beran

[57] ABSTRACT

An automatic transmission provided with a combination of a belt drive continuously-variable speed transmission mechanism and a hydraulic control circuit. The belt drive continuously-variable speed transmission mechanism has an input variable-pitch pulley assembly and an output variable-pitch pulley assembly. The hydraulic control circuit includes a regulator valve, a throttle pressure valve, a reduction ratio detecting valve, a reduction ratio control valve and a reduction ratio control mechanism. The reduction ratio control valve has an axially slidable spool and two pressure chambers formed in the valve body thereof at both axial ends of the spool respectively. The reduction ratio control mechanism includes conduits for conducting the working fluid of a throttle pressure to the pressure chambers of the reduction ratio control valve and two solenoid valves adapted to drain the corresponding pressure chambers, respectively, when actuated.

3 Claims, 34 Drawing Figures

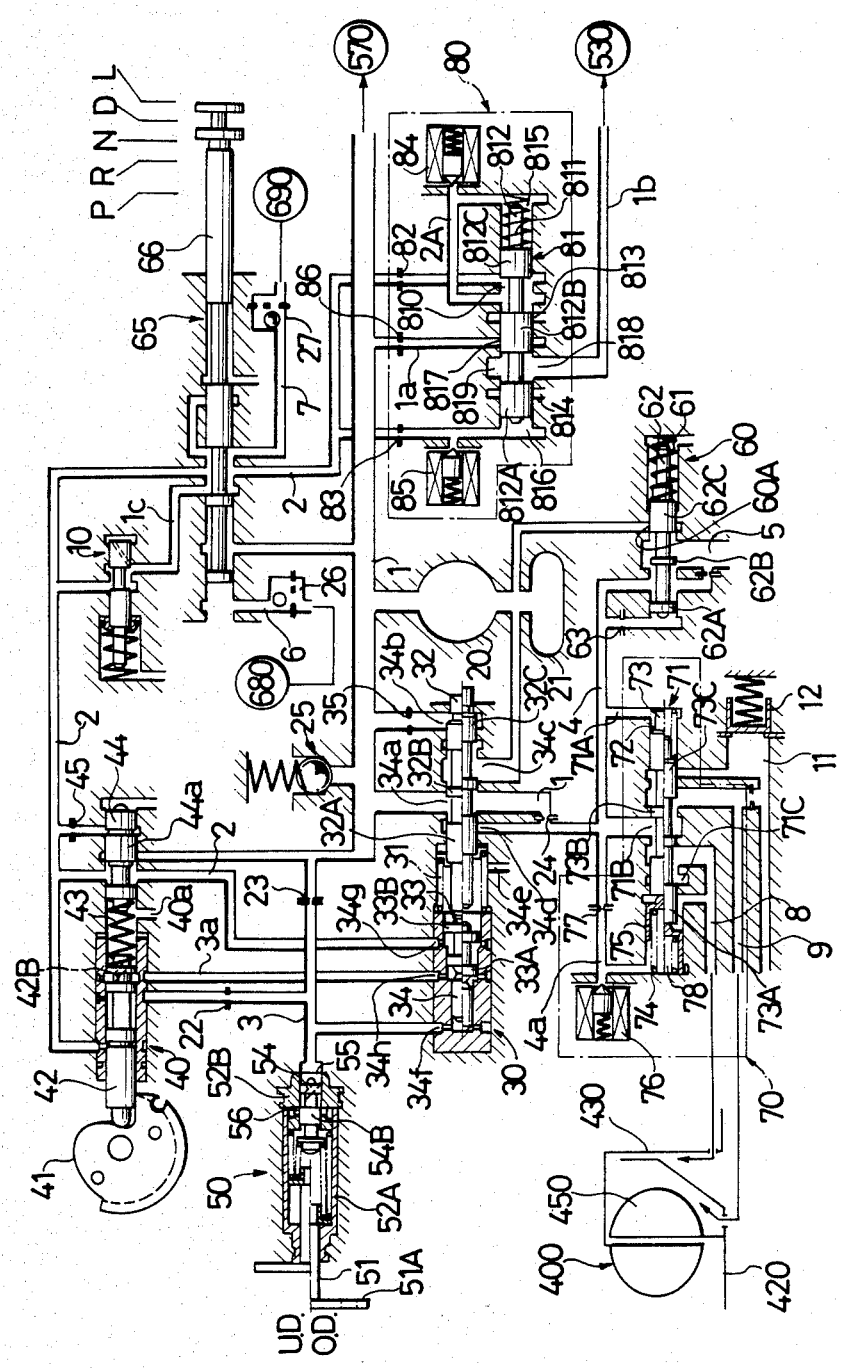

HYDRAULIC CONTROL SYSTEM FOR A V-BELT TRANSMISSION

BACKGROUND OF THE INVENTION

1. Field of the Invention

The present invention relates to an automatic transmission for a vehicle and more particularly to an automatic transmission provided with a belt drive continuously-variable speed transmission mechanism.

2. Description of the Prior Art

A belt drive continuously-variable speed transmission mechanism is employed in combination with a torque converter or a fluid coupling, and a changeover mechanism including a forward drive and a reverse drive in an automatic transmission for a vehicle.

The belt drive continuously-variable speed transmission includes generally an input shaft, an input variable-pitch pulley having a fixed pulley flange fixed concentrically to the input shaft and a movable pulley flange mounted concentrically with and axially slidably on the input shaft, an output shaft disposed in parallel with the input shaft, an output variable-pitch pulley having a fixed pulley flange fixed concentrically to the output shaft and a movable pulley flange mounted concentrically with and axially slidably on the output shaft, an endless belt interconnecting the input and the output variable-pitch pulleys and hydraulic servomotors provided for the input and the output variable-pitch pulleys respectively for pressing the corresponding movable pulley flanges toward the corresponding movable pulley flanges, and a hydraulic control circuit including a pressure generating source, a regulator valve to control the fluid pressure of the pressure generating source and adapted to generate a line pressure corresponding to pressure signals fed thereto, a throttle pressure valve to control the line pressure and adapted to generate a pressure corresponding to a throttle opening of the internal-combustion engine and to feed the pressure to the regulator valve as a throttle pressure signal, a reduction ratio detecting valve to control the line pressure and adapted to generate a pressure corresponding to the axial displacement of the movable pulley flange of the output variable-pitch pulley mounted on the output shaft and to feed the pressure to the regulator valve as a reduction ratio pressure signal, means to supply the working fluid at the line pressure to the hydraulic servomotor formed within the output variable-pitch pulley, and a reduction ratio control mechanism including a reduction ratio control valve having an axially slidable spool and two pressure chambers formed in the valve body thereof at both axial ends of the spool respectively and adapted to supply the line pressure selectively to the hydraulic servomotor of the input variable-pitch pulley through the movement of the spool, fluid passages to conduct the working fluid at the line pressure to the pressure chambers and solenoid valves to regulate the respective pressures in the two pressure chambers respectively.

Since those component solenoid valves of the reduction ratio control mechanism included in the hydraulic control circuit function to maintain the line pressure in the two pressure chambers of the reduction ratio control valve or to drain the same pressure chamber, capacity and durability which are sufficient to withstand the line pressure are required of the solenoid valves.

SUMMARY OF THE INVENTION

The present invention relates generally to an automatic transmission for a vehicle, comprising, in combination, a belt drive continulusly-variable speed transmission mechanism and a hydraulic control circuit. The belt drive continuously-variable speed transmission mechanism includes an input shaft, an input variable-pitch pulley having a fixed pulley flange fixed concentrically to the input shaft and a movable pulley flange mounted concentrically and axially slidably on the input shaft, an output shaft disposed in parallel with the input shaft, an output variable-pitch pulley having a fixed pulley flange fixed concentrically to the output shaft and a movable pulley flange mounted concentrically and axially slidably on the output shaft, an endless belt interconnecting the input and the output variable-pitch pulleys and hydraulic servomotors provided for the input and the output variable-pitch pulleys respectively for pressing the corresponding movable pulley flanges toward the corresponding fixed pulley flanges. The hydraulic control circuit includes a pressure generating source, first valve means to control the pressure of the fluid delivered from the pressure generating source and adapted to generate a line pressure corresponding to a pressure signal fed thereto, second valve means to control the line pressure and adapted to generate a pressure corresponding to a throttle opening of the internal-combustion engine and to feed the pressure to the first valve means as a throttle pressure signal, third valve means to control the line pressure and adapted to generate a pressure corresponding to the axial displacement of the movable pulley flange of the variable-pitch pulley mounted on the shaft and to feed the pressure to the first valve means as a reduction ratio pressure signal, means to supply the line pressure to the hydraulic servomotor provided for the output variable-pitch pulley, fourth valve means having a spool and two pressure chambers formed in the valve body thereof at both axial ends, respectively of the spool and adapted to supply the line pressure selectively to the hydraulic servomotor of the input variable-pitch pulley and reduction ratio control means having fluid passages connecting the two pressure chambers of the fourth valve means to the output side of the second valve means and two solenoid valves for regulating the respective pressures in the two pressure chambers individually and respectively.

Accordingly, it is an object of the present invention to provide an automatic transmission for a vehicle, wherein the working fluid at a throttle pressure, which is lower than the line pressure, is applied to the pressure chambers formed at both ends of the spool, respectively, of the fourth valve means and the durability of the automatic transmission is not less than that of the conventional automatic transmission, even though smaller and less expensive solenoid valves are employed in the reduction ratio control means.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1A:
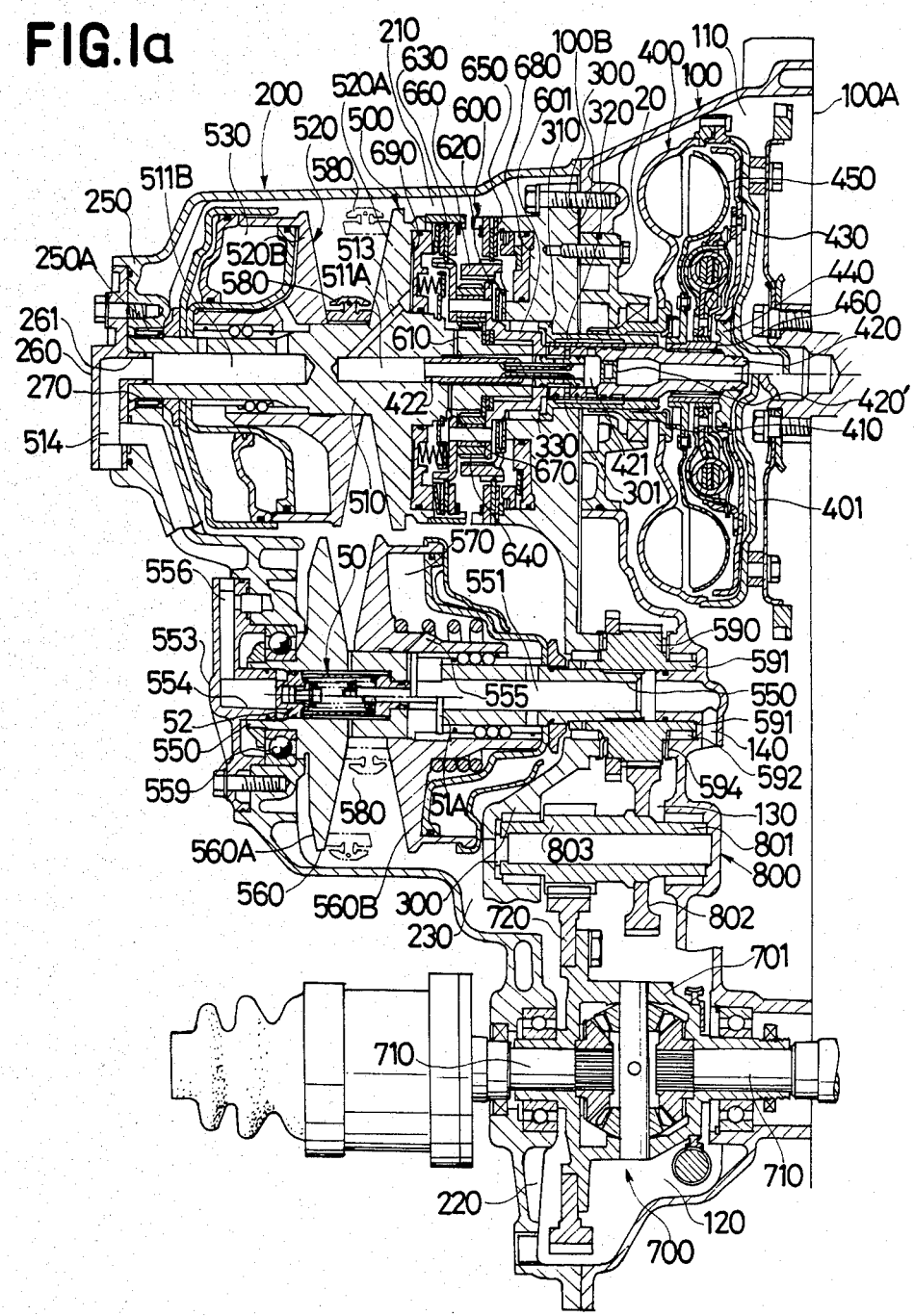
FIG. 1a is a sectional view of an automatic transmission for a vehicle in accordance with the present invention.

Referring to the accompanying drawings and first to FIG. 1, indicated by reference numeral 100 is a torque converter casing, indicated by reference numeral 200 is a transmission casing and indicated by reference numeral 300 is a center casing. These casings 100, 200 and 300 are interconnected with bolts with the center casing 300 disposed between the others to form the housing of an automatic transmission for a vehicle.

The torque converter casing 100 has an opening provided at a fixing surface 100A thereof joined to an internal-combustion engine, not shown, and including therein a converter room 100 for housing therein a torque converter or a fluid coupling 400 and the other opening provided at the other fixing surface thereof joined to the transmission casing 200 and including therein a differential gear room 120 for housing a differential gear 700 and an idle gear room 130 for housing an idle gear 800. The transmission casing 200 has an opening provided at a fixing surface joined to the torque converter casing 100 and including therein a transmission room 210 for housing a belt drive continuously-variable speed transmission mechanism (referred to simply as "belt drive transmission mechanism" hereinafter) 500, a differential gear room 220 facing the differential gear room 120 and an idle gear room 230 facing the idle gear room 130. Both ends of the casing 701 of the differential gear 700 and both ends of the shaft 801 of the idle gear 800 are supported pivotally in the torque converter casing 100 and the transmission casing 200 respectively. The center casing 300 is disposed within the transmission casing 200 and fixed to the fixing surface 100B formed in the wall of the converter room 110 of the torque converter casing 100 on the portion facing to the transmission room 210.

The fluid coupling 400 comprises a casing 401 and a pump, each being connected to the output shaft of the internal-combustion engine, an output shaft 420, a turbine 450 fixed to a hub 460 splined to the output shaft 420 and a piston 430 for a lock-up clutch connected to the hub 440 splined to the output shaft 420. The output shaft 420 of the fluid coupling 400 is supported rotatably in a sleeve 310 fitted in the center casing 300 through a plain bearing 320.

An oil pump 20 is affixed to the wall of the converter room 110 and the rotor thereof is driven by a hollow shaft 410 connected to the casing 401 of the fluid coupling 400 and disposed coaxially with the output shaft 420.

The belt drive transmission mechanism 500 comprises an input shaft 510 rotatably supported at both ends thereof in the center casing 300 and the transmission casing 200, an output shaft 550 arranged in parallel to the input shaft 510 and rotatably supported at one end thereof in the torque converter casing 100 and the center casing 300 and at the other end thereof in the transmission casing 200, an input pulley 520 consisting of a fixed flange 520A formed integrally with the input shaft 510 and a movable flange 520B axially slidably mounted on the input shaft 510, an output pulley 560 consisting of a fixed flange 560A formed integrally with the output shaft 550 and a movable flange 560B axially slidably mounted on the output shaft 550, hydraulic servomotors 530 and 570 mounted on the input shaft 510 and the output shaft 550 for moving the movable flanges 520B and 560B, respectively, and a V-belt 580 extended between the input pulley 520 and the output pulley 560 for transmitting torque from the input shaft 510 to the output shaft 550.

A planetary gear mechanism 600 is interposed between the output shaft 420 of the fluid coupling 400 and the input shaft 510 of the belt drive transmission mechanism 500. The planetary gear mechanism 600 comprises a hollow input shaft 601 formed integrally with the end portion of the output shaft 420 of the fluid coupling 400 in a diameter greater than that of the output shaft 420, an output shaft 610 formed integrally with the input shaft 510 of the belt drive transmission mechanism 500, a sun gear 670 formed integrally with the output shaft 610 on the circumference thereof, a planetary carrier 620 capable of being engaged with and disengaged from the fixed flange 520A of the input pulley 520 of the belt drive transmission mechanism 500 by means of a multiple disc clutch 630 held by the fixed flange 520A, a ring gear 660 capable of being engaged with and disengaged from the center casing 300 by means of a multiple disc brake 650 held by the center casing 300, planetary pinions 640 each being rotatably supported on the planetary carrier 620 and meshed with the sun gear 670 and the ring gear 660, a hydraulic servomotor 680 formed in the wall of the center casing 300 for operating the multiple disc brake 650 and a hydraulic servomotor 690 formed in the wall of the fixed flange 520A for operating the multiple disc clutch 630.

The input shaft 510 of the belt drive transmission mechanism 500 is disposed coaxially with the output shaft 420 of the fluid coupling 400. One end of the input shaft 510 nearby the fluid coupling 400 is relatively rotatably supported within the hollow input shaft 601 of the planetary gear mechanism 600 in a bearing, while the other end of the input shaft 510 is rotatably supported in a hole 250A of the wall 250 of the transmission casing 200. Oil passages 511A and 511B are drilled separately and individually in the input shaft 510. The oil passage 511A communicates with an oil passage 421 formed in the output shaft 420 of the fluid coupling 400 which is partitioned with a plug 420' through a sleeve 422, while the oil passage 511B communicates with an oil passage 514 formed in an end cap 260 fixed to the transmission casing 200 with bolts to close the hole 250A of the wall 250.

The idle gear 800 comprises the shaft 801 rotatably supported in the torque converter casing 100 and the center casing 300 at each end thereof in parallel to the output shaft 550 of the belt drive transmission mechanism 500, an input gear 802 fixed to the shaft 801 and engaging with an output gear 590 fixed to the output shaft 550 of the belt drive transmission mechanism 500 and an output gear 803 formed integrally with the shaft 801.

The differential gear 700 comprises the casing 701 fixedly holding an input gear 720 engaging with the output gear 803 of the idle gear 800, two output shafts 710 rotatably supported in the casing 701 and connected to the right and the left axle shafts respectively, bevel gears fixed to the output shafts 710 and intermediate bevel gears engaging with the bevel gears. The casing 701 is supported rotatably in bearings on the torque converter casing 100 and the transmission casing 200 with the output shafts 710 disposed in parallel to the shaft 801 of the idle gear 800.

The oil passage 511A formed along the axis of the input shaft 510 of the belt drive transmission mechanism 500 communicates with the hydraulic servomotor 690 by means of an oil passage 513 formed in the central portion of the fixed flange 520A of the input pulley 520 and serves as an oil passage to supply pressurized oil to and to discharge the pressurized oil from the hydraulic servomotor 690 through an oil passage, not shown, formed in the center casing 300, an oil passage 301 formed in the plain bearing 320, an oil hole drilled in the output shaft 420 of the fluid coupling 400 and the sleeve 422. The other oil passage 511B formed along the center axis of the input shaft 511 communicates with the hydraulic servomotor 530 by means of an oil hole drilled in the input shaft 511, splines formed in the outer circumference of the input shaft 511 and an oil passage formed in the central portion of the movable flange 520B. A cylindrical hollow projection 261 projecting inwardly of the transmission casing 200 is formed in the end cap 260 affixed to the wall 250 of the transmission casing 200. The projection 261 is fitted in the oil passage 511B of the input shaft 511. The input shaft 511 is supported at the end thereof in a bearing 270 fitted in the hole 250A formed in the wall 250. The oil passage 511B communicates with the oil passage 514 through the inside of the projection 261 to supply pressurized oil to and to discharge the pressurized oil from the hydraulic servomotor 530.

The output gear 590 mounted on one end of the output shaft 550 is formed integrally with a hollow support shaft 591. The support shaft 591 is supported rotatably at both ends thereof by the torque converter casing 100 and the center casing 300 respectively in roller bearings 592 and at the same time, is splined to the output shaft 550. Needle bearings 594 are interposed between both sides of the output gear 590 and the casings 100 and 300 respectively. The output shaft 550 is supported rotatably at the other end thereof by the transmission casing 200 in a ball bearing 559.

The output shaft 550 is formed in a hollow shaft. The valve body 52 of a reduction ratio detecting valve 50 is fitted in the hollow of the output shaft 550 at a position corresponding to the output pulley 560 and is secured at the position by means of a cylindrical hollow projection 554 formed in an end cap 553 fixed to the transmission casing 200 with bolts. The rest portion of the hollow of the output shaft 550 serves as an oil passage 551 for supplying the pressurized oil supplied from the oil passage 140 formed in the torque converter casing 100 to the hydraulic servomotor 570 through an oil hole 555 drilled in the movable flange 560B.

Figure 1B:
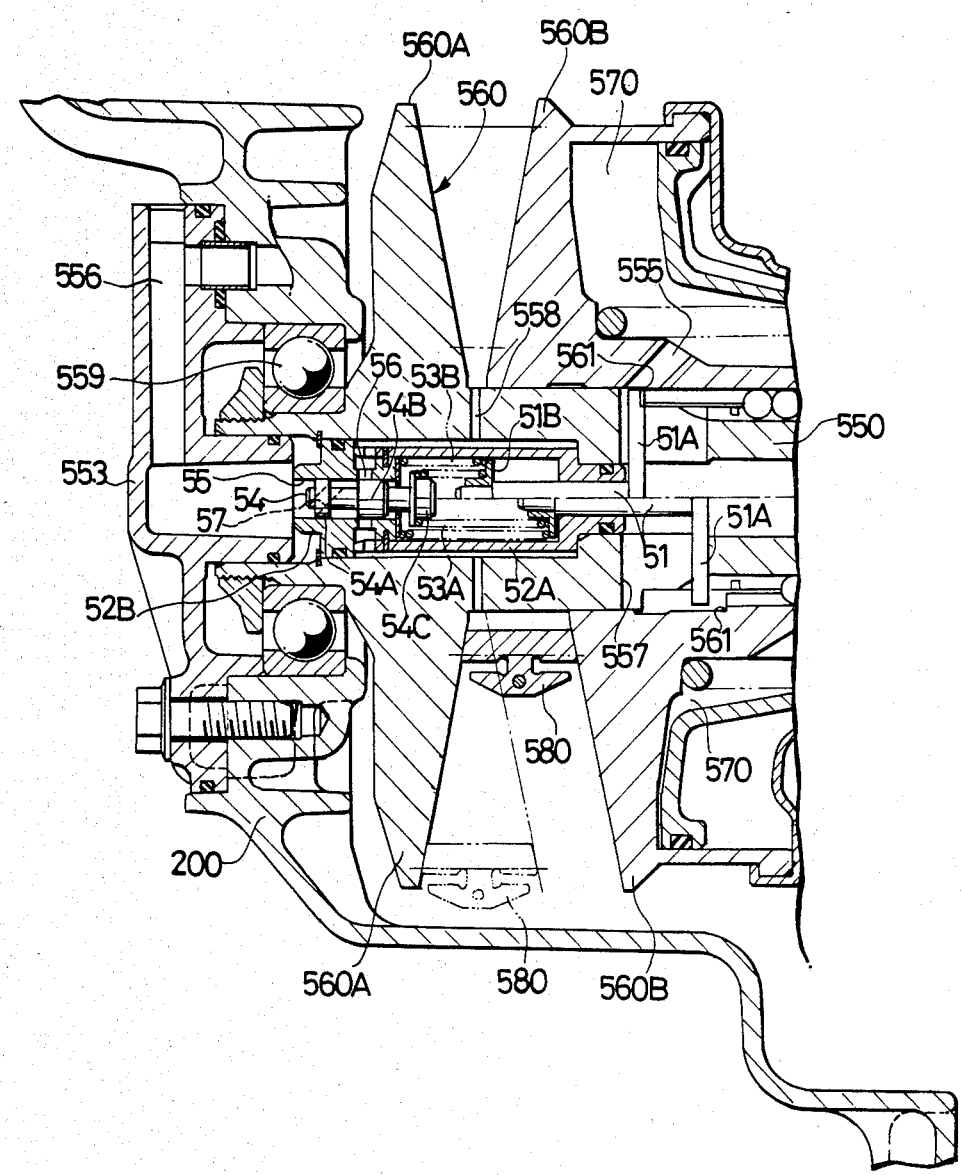
FIG. 1b is an enlarged view of a part of FIG. 1a, FIG. 2 is a circuit diagram of the hydraulic control system of the automatic transmission of FIG. 1a, FIG. 3 is a graph showing the characteristics of the output pressure of the reducation ratio control valve.

An enlarged view of the reduction ratio detecting valve 50 is shown in FIG. 1b. The valve body 52 includes two hollow cylinders 52A and 52B. A portion of the hollow cylinder 52B having a reduced outer diameter is fitted in the axial bore of the hollow cylinder 52A and fastened thereto with pins. A detecting rod 51 is axially slidably supported in the cylinder 52A and is provided fixedly at the free end thereof projecting from the cylinder 52A with an engaging pin 51A. The engaging pin 51A penetrates diametrically through a bore 557 formed in the output shaft 550 and the free end thereof engages with a stepped portion 561 formed in the inner circumference of the movable flange 560B. A spool 54 having two lands 54A and 54B and a head 54C arranged axially at predetermined intervals is axially slidably fitted in a port 55 formed axially in one end portion of the hollow cylinder 52B. A disc 51B is fixed to a stepped portion formed in the end portion of the detecting rod 51 extending within the cylinder 52A. Compression springs 53A and 53B are interposed between the disc 51B and the head 54C of the spool 54 and between the disc 51B and the end of the cylinder 52B respectively. A drain port 56 designed to be opened or closed by the land 54B of the spool 54 is formed in the cylinder 52B. An oil passage 57 is formed in the spool 54 to make the space between the lands 54A and 54B communicate with an oil passage 556 through the port 55. When the land 54B is displaced due to the change of the resilient force of the spring 53A to open the drain port 56, a part of the pressurized oil contained in the oil passage 556 is discharged through the oil passage 57, the drain port 56, a bore formed in the cylinder 52A, a clearance between the cylinder 52A and the output shaft 550 and a radial bore 558 formed in the output shaft 550 to produce a predetermined oil pressure within the oil passage 556.

FIG. 2 is a circuit diagram of the hydraulic control system for the automatic transmission shown in FIG. 1a for a vehicle. In FIG. 2, there are shown a primary regulator valve 30, a throttle pressure valve 40, abovementioned reduction ratio detecting valve 50, a secondary regulator valve 60, a manual selector valve 65 controlled by the driver of the vehicle, a lock-up control unit 70 for controlling the lock-up clutch mechanism and a reduction ratio (torque ratio) control mechanism 80 for the belt drive transmission mechanism 500.

The hydraulic servomotor 570 of the belt drive transmission mechanism 500 is connected to a passage 1 through passages 140 and 551. The oil pump 20 pumps up oil from an oil pump 21 and supplies the oil to the passage 1. The hydraulic servomotor 530 is connected to a passage 1b of the reduction ratio control mechanism 80.

The primary regulator valve 30 regulates the oil pressure of the passage 1 to a line pressure in a manner as will be described below.

Figure 3:
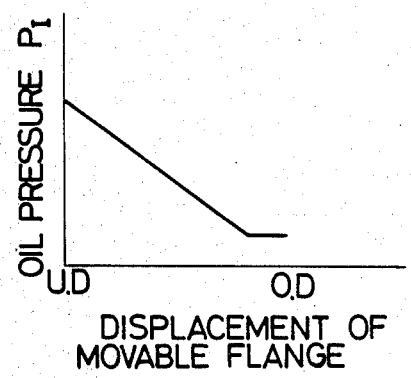

The port 55 of the reduction ratio detecting valve 50 formed in the end of the cylinder 52B communicates with a passage 3 branched from the passage 1 via an orifice 23 by means of the oil passage 556. As the movable flange 560B of the output pulley 560 of the belt drive transmission mechanism 500 moves with respect to the fixed flange 560A, the detecting rod 51 is moved according to the displacement of the movable flange 560B due to the action of the resilient forces of the springs 53A and 53B acting on the detecting rod 51 of the detecting valve 50 and the engagement of the engaging pin 51A with the stepped portion 561 of the output shaft 550, so that the resilient force of the spring 53A is changed, whereby the spool 54 is caused to move. Then, the drain port 56 is opened or closed according to the displacement of the movable flange 560B to create reduction ratio pressure $P_I$ of the characteristics as shown in FIG. 3 in the passage 3.

The throttle pressure valve 40 regulates the line pressure supplied thereto through the passage 1 according to the degree of throttle opening to supply oil at a first throttle pressure to the passage 2. When the degree of throttle opening is greater than a predetermined value $\theta_1$, the throttle valve 40 supplies also the reduction ratio pressure provided by the reduction ratio detecting valve 50 and applied thereto via the passage 3 and the orifice 22 as a second throttle pressure to a passage 3a.

The secondary regulator valve 60 is connected to a passage 4 which is connected to the passage 1 through an orifice 24 to regulate the oil pressure of the surplus oil exhausted from the regulator valve 30 in the passage 4 and to supply the surplus oil to the lubricating system of the automatic transmission through a passage 5 as a lubricant.

The manual selector valve 65 is operated by means of a shift lever provided nearby the driver's seat to distribute the line pressure in the passage 1 corresponding to the shift position of the manual selector valve 65.

The lock-up control mechanism 70 supplies the oil pressure in the passage 4 to the fluid coupling 400 corresponding to the input pressure applied thereto to control the engagement and disengagement operation of the lock-up clutch 430.

The reduction ratio control mechanism 80 supplies the oil pressure in the passage 1a connected to the passage 1 via a large diameter orifice 86 to the hydraulic servomotor 530 of the input pulley 520 corresponding to the input pressure applied thereto to control the reduction ratio (torque ratio) of the belt drive transmission mechanism 500.

There are shown further a low modulator valve 10 provided in a passage 1c which communicates with the passage 1 when the manual selector valve 65 is shifted to the L-range position to regulate the line pressure to supply low modulator pressure to the passage 2, a relief valve 12 provided in an oil cooler passage 11, a relief valve 25 provided in the passage 1, a flow rate control valve 26 having a check valve provided in a supply passage 6 for supplying the line pressure to the hydraulic servomotor 680 of the multiple disc brake 650 of the planetary gear mechanism 600 and a flow rate control valve 27 having a check valve provided in a passage 7 for supplying the line pressure to the hydraulic servomotor 690 of the multiple disc clutch 630 of the planetary gear mechanism 600.

Figure 4:
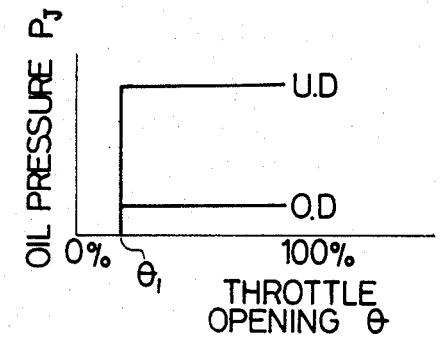
FIG. 4 is a graph showing the characteristics of the second throttle pressure provided by the throttle pressure valve.
Figure 5:
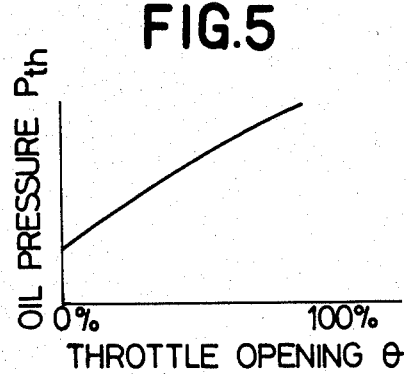
FIGS. 5 and 6 are graphs showing the characteristics of the first throttle pressure provided by the throttle pressure valve.
Figure 6:
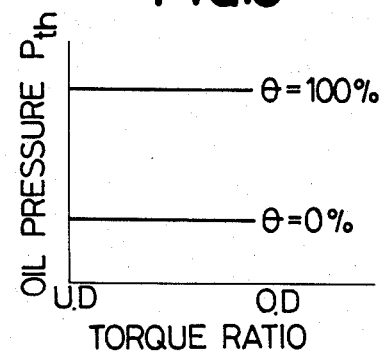

The throttle pressure valve 40 has a throttle plunger 42 disposed in contact with and adapted to be displaced by a throttle cam 41 linked with the accelerator pedal provided in the driver's cabin and a spool 44 arranged in series with the throttle plunger 42 with a spring 43 interposed therebetween. The plunger 42 and the spool 44 are displaced to the left with increase in the degree of throttle opening $\theta$. The plunger 42 connects passages 3 and 3a to create a second throttle pressure which is equivalent to the reduction ratio pressure $P_I$ in the passage 3a when the angle of rotation of the throttle cam 41 and the pressure in the passage 2 acting on the plunger 42 become values exceeding values corresponding to the predetermined value $\theta_1$ of the degree of throttle opening $\theta$. While the degree of throttle opening $\theta$ is less than the predetermined value $\theta_1$, the pressure in the passage 3a is exhausted from a drain port 40a through an oil passage 42B formed from one to the other side of a land of the plunger 42 to create a second throttle pressure $P_J$ in the passage 3a as shown in FIG. 4. The movement of the throttle cam 41 is transmitted to the spool 44 through the plunger 42 and the spring 43. The spool 44 is displaced according to the resilient force of the spring 43 corresponding to the degree of the throttle opening $\theta$ and the pressure in the passage 2 applied to the land 44a via an orifice 45 to change the area of the port connecting the passages 1 and 2, so that the first throttle pressure $P_{th}$ produced in the passage 2 is regulated as shown in FIGS. 5 and 6.

The regulator valve 30 comprises a spool 32 having lands 32A, 32B and 32C and biased by a spring 31 received by a disc attached to the left side of the spool 32, a first regulator plunger 33 disposed coaxially and in series with the spool 32 and having land 33A with a small diameter and a land 33B with a large diameter, a second regulator plunger 34 disposed coaxially, contiguously to and in series with the plunger 33, a port 34a connected to the passage 1, a port 34b to which the line pressure is supplied through an orifice 35, a drain port 34c, a port 34d for discharging surplus oil into the passage 4, a drain port 34e for draining oil leaking through the clearance between the lands and the wall of the valve body, an input port 34f for receiving the reduction ratio pressure $P_I$ from the passage 3, and input port 34g for receiving the first throttle pressure $P_{th}$ from the passage 2 and a port 34h for receiving the second throttle pressure $P_J$ from the passage 3a.

Figure 7:
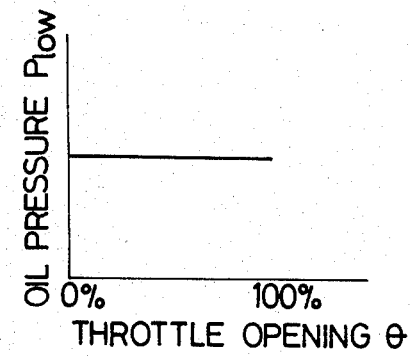
FIG. 7 is a graph showing the characteristics of the low modulator pressure provided by the low modulator valve.
Figure 8:
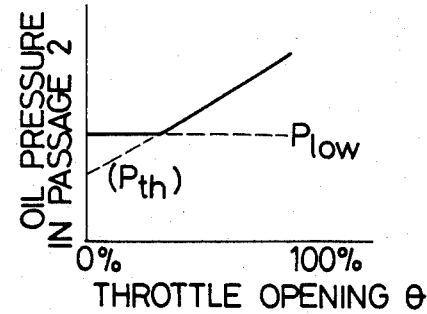
FIG. 8 is a graph showing the characteristics of the pressure produced in the passage 2.

The low modulator valve 10 generates a low modulator pressure $P_{low}$ as shown in FIG. 7 independently of the degree of throttle opening, when the manual selector valve 70 is placed in the L-range position. Both the low modulator valve 10 and the throttle pressure valve 40 are not provided with any drain passage for pressure regulation and are designed to perform pressure regulation by using the continuous draining of the oil of the throttle pressure $P_{th}$ from the reduction ratio control mechanism 80, which will be described hereinafter. Those valves 10 and 40 are arranged in parallel to each other. Accordingly, with the manual selector valve 70 placed in the L-range position, the higher pressure between the pressures $P_{low}$ and $P_{th}$ as shown in FIG. 8 is created in the passage 2 and hence, as shown in FIG. 9, the line pressure $P_L$ when the manual selector valve is placed in the L-range position and the degree of throttle opening is small is greater than the line pressure when the manual selector valve is placed in the D-range position.

Figure 9:
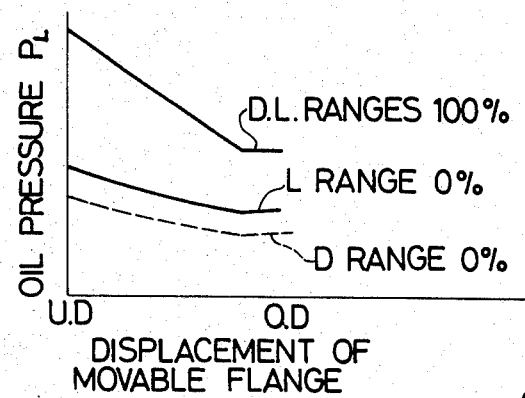
FIGS. 9, 10 and 11 are graphs showing the characteristics of the line pressure provided by the pressure regulating valve.
Figure 10:
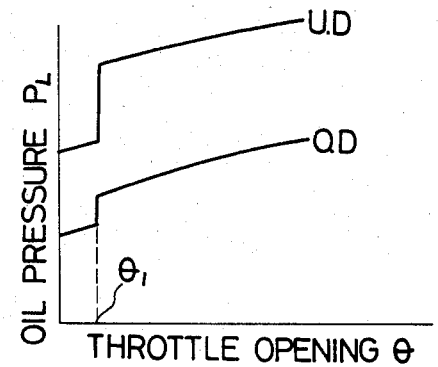
Figure 11:
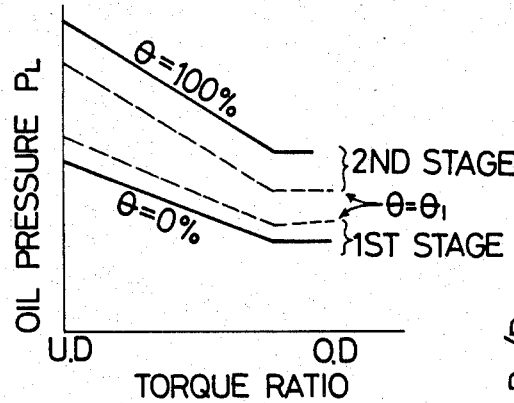

The spool 32 of the regulator valve 30 is displaced by the reduction ratio pressure $P_I$ received through the port 34f and applied to the plunger 34, the first throttle pressure $P_{th}$ received through the port 34g and applied to the land 33B of the first plunger 33, the second throttle pressure $P_J$ received through the port 34h and applied to the land 33A of the first plunger 33, the resilient force of the spring 31 and the line pressure received through the port 34b connected to the passage 1 through an orifice 35 and applied to the land 32C to regulate the respective areas of the port 34a connected to the passage 1, the port 34d connected to the passage 4 and the drain port 34c, hence the rate of leakage of the pressurized oil from the passage 1, so that the line pressure $P_L$ of the characteristics shown in FIGS. 9, 10 and 11 is created.

It is necessary to downshift into the L-range to employ strong engine brake. In the belt drive transmission mechanism 500, downshift is attained by connecting the passage connected to the hydraulic servomotor 530 of the input pulley 520 to a drain passage to drain the oil chamber of the servomotor. However, when strong engine brake is applied, the input pulley 520 is caused to rotate at a high revolving rate and the oil pressure created by centrifugal force due to the rotation of the input pulley 520 is liable to impede draining the oil chamber of the servomotor. Accordingly, when quick downshift is required, it is necessary to raise the oil pressure supplied to the hydraulic servomotor 570 of the output pulley 560 above the normal pressure, which is particularly significant when the degree of throttle opening is small. Therefore, when the manual selector valve is placed in the L-range, the throttle pressure $P_{th}$ corresponding to the small degree of throttle opening $\theta$ is increased to raise the line pressure $P_L$ which is equivalent to the oil pressure supplied to the servomotor 570 of the output pulley 560.

The manual selector valve 65 is controlled with a shift lever provided nearby the driver's seat. The spool 66 of the manual selector valve 65 is movable through five positions which are parking range P, reverse range R, neutral position N, drive range D and low range L. In the respective shift positions, the passages 1c, 6 and 7 are connected to the passage 1 or 2 as shown in TABLE 1.

TABLE 1

|  | P | R | N | D | L |
|---|---|---|---|---|---|
| Line 7 | x | x | x | Δ | Δ |
| Line 6 | x | o | x | x | x |
| Line 1c | — | — | Δ | Δ | o |

In TABLE 1, symbols represent the conditions of those lines: "o" denotes connection to the line 1, "Δ" denotes connection to the line 2, "—" denotes blocked and "x" denotes drained. As shown in TABLE 1, in R-range the line pressure is supplied to the hydraulic servomotor 680 of the brake 650 of the planetary gear mechanism, while in D-range and L-range, the throttle pressure in the line 2 (or the low modulator pressure) is supplied to the hydraulic servomotor 690 of the clutch 630 to changeover between the forward drive condition and reverse drive conditions. The secondary regulator valve 60 has a spool 62 having lands 62A, 62B and 62C and biased at one end thereof with a spring 61. The spool 62 is displaced by the agency of the resilient force of the spring 61 and the oil pressure applied to the land 62A through an orifice 63 to regulate the pressure in the passage 4 through the passage 5 by changing the flow through an oil passage connecting the passages 4 and 5 and the flow through the drain port 60A and to supply the oil to the lubricating system. Excessive working fluid is drain through the drain port 60A.

The reduction ratio control mechanism 80 includes a reduction ratio control valve 81, orifices 82 and 83, an upshift solenoid valve 84 and a downshift solenoid valve 85. The reduction ratio control valve 81 has a spool 812 provided with a first land 812A, a second land 812B and a third land 812C and biased with a spring 811 provided contiguously to the third land 812C, end oil chambers 815 and 816 to which is supplied the throttle pressure or the low modulator pressure from the passage 2 through the orifices 82 and 83 respectively, an intermediate oil chamber 810 formed between the lands 812B and 812C, an oil passage 2A connecting the oil chambers 815 and 810, an input port 817 connected to the passage 1 supplying the line pressure through the large diameter orifice 86 and the passage 1a and adapted to vary in the area according to the movement of the spool 812, a pressure regulating chamber 819 provided with an output port 818 connected to the hydraulic servomotor 530 of the input pulley 520 of the belt drive transmission mechanism 500 through the passage 1b, a drain port 814 for draining the oil chamber 819 corresponding to the movement of the spool 812 and a drain port 813 for draining the oil chambers 810 and 815 corresponding to the movement of the spool 812. The upshift solenoid valve 84 and the downshift solenoid valve 85 are connected to the oil chamber 815 and the oil chamber 816, respectively, of the reduction ratio control valve 81 and are operated by output signals provided by an electric control circuit to drain the oil chambers 815 and 816 respectively.

In the first embodiment shown in FIGS. 2 and 15, the lock-up control mechanism 70 includes a lock-up control valve 71, an orifice 77 and a soelnoid valve 76 for controlling the oil pressure in a passage 4a connected to the passage 4 through the orifice 77. The lock-up control valve 71 includes a spool having lands 73A, 73B and 73C of the same diameter and being biased by a spring 72 placed on the right side of the spool 73 and a sleeve 75 having a diameter greater than that of the lands of the spool 73, disposed in series with the spool 73 and biased by a spring 74 placed on the left side of the sleeve 75. Alternatively, in the lock-up control mechanism 70 employed in a second embodiment shown in FIG. 16, the spring 72 is omitted. Furthermore, in the lock-up control mechanism 70 employed in a third embodiment shown in FIG. 17, the land 73A of the spool 73 is omitted and the sleeve 75 and the spool 73 are formed integrally in a single member. In the first embodiment shown in FIG. 15, the spool 73 is displaced by the agency of an oil pressure $P_1$ in the passage 4 acting on the land 73C via the port 71A connected to the passage 4 and the resilient force $F_{S1}$ of the spring 72 each acting on the spool 73 in one direction and the solenoid pressure $P_S$ in the passage 4a controlled by the solenoid valve 76 and acting on the sleeve 75 or the oil pressure $P_2$ in the clutch releasing passage 8 of the lock-up clutch acting on the land 73A through the port 71B and the resilient force $F_{S2}$ of the spring 74 each acting on the spool 73 in the other direction, whereby the connection of the passage 4 to the clutch releasing passage 8 or to the clutch engaging passage 9 of the lock-up clutch 430 is controlled. While an electric power is supplied to the solenoid valve 76 and the same is in ON-position, the valve element of the solenoid valve 76 opens the valve port to drain the passage 4a, and the spool 73 is retained at the left end position, so that the passages 4 and 9 are interconnected and the working fluid is allowed to flow from the oil passage 9 through the lock-up clutch 430 and the oil passage 8 to the drain port 71C, whereby the lock-up clutch 430 remains engaged. While the power supply to the solenoid valve 76 is interrupted and thereby the valve port of the same is blocked (OFF-position), the oil pressure in the passage 4a is maintained, the spool 73 is retained at the right end position and the passage 4 and the oil passage 8 are interconnected, so that the working fluid is allowed to flow from the oil passage 8 through the lock-up clutch 430 and the oil passage 9 to a passage 11 connected to an oil cooler, whereby the lock-up clutch 430 remains released.

The functions of the lock-up control mechanism 70 will be described hereinafter.

In an automatic transmission equipped with a lock-up clutch, a shock is produced upon the engagement of the lock-up clutch due to the difference in the revolving rate between the pump side and the turbine side of the torque converter or the fluid coupling during the course of the engagement of the lock-up clutch, which affect comfortableness adversely. Accordingly, in a conventional automatic transmission of this type, the lock-up clutch is engaged while the vehicle is running at a higher running speed. Where the difference in the revolving rate between the pump side and the turbine side of the torque converter or the fluid coupling is smaller and hence only a reduced shock is produced upon the engagement of the lock-up clutch. In such a manner of engaging the lock-up clutch, however, the engagement of the lock-up clutch is required to be performed while the vehicle is running at a higher running speed and the engagement of the lock-up clutch is impossible while the vehicle is running at a lower running speed and hence the effect of the lock-up clutch can not be exhibited sufficiently. According to the present invention, there is provided a lock-up control mechanism capable of regulating the lock-up clutch engaging pressure and the lock-up clutch releasing pressure in engaging the lock-up clutch to mitigate the shock of engagement of the lock-up clutch.

Figure 18A:
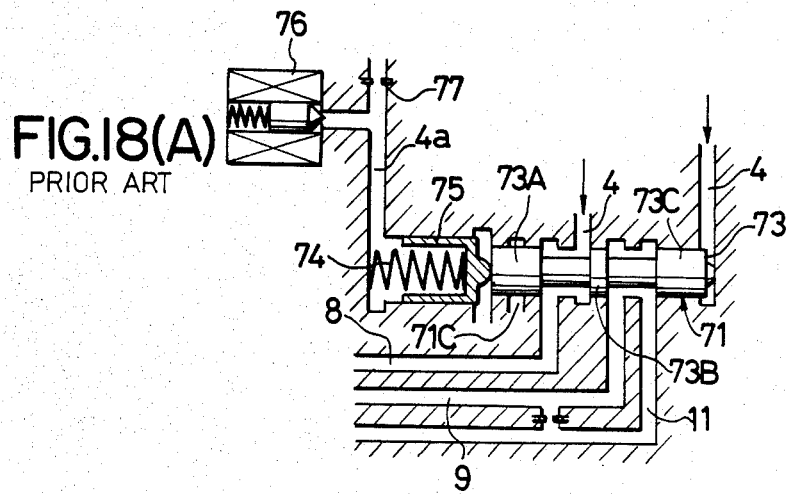
FIGS. 18A, 18B and 18C are views explaining the operation of a conventional lock-up control valve.
Figure 18B:
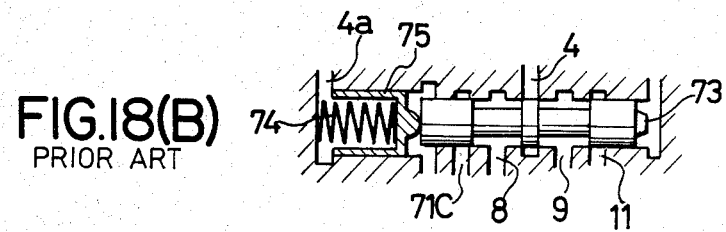
Figure 18C:
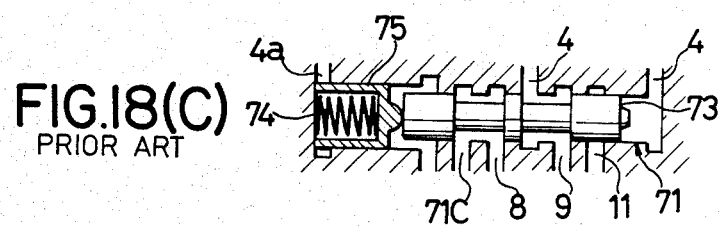

In a prior art shown in FIG. 18, the lock-up control valve 71 functions merely in the manner as shown in FIGS. 18A and 18C and the spool 73 of the lock-up control valve 71 is never retained at the intermediate position as shown in FIG. 18B. That is, while the solenoid valve 76 is in OFF-position, the spool 73 of the lock-up control valve 71 is placed at the right end position, the fluid coupling supply pressure supply passage 4 is connected to the lock-up clutch releasing passage 8 and the lock-up clutch engaging passage 9 is connected to the cooler by-pass passage 11 to allow the working fluid to flow from the passage 8 to the passage 9, whereby the lock-up clutch is released (FIG. 18A), whereas, while the solenoid valve 76 is in ON-position, the passage 4 is connected to the passage 9 and the passage 8 is connected to the drain port 71C to allow the working fluid to flow from the passage 9 to the passage 8 (FIG. 18C), whereby the lock-up clutch is engaged.

The lock-up control valve 71 of a lock-up control mechanism 70 of the present invention as employed in the third embodiment thereof will be described hereinafter with reference to FIG. 17.

Figure 17A:
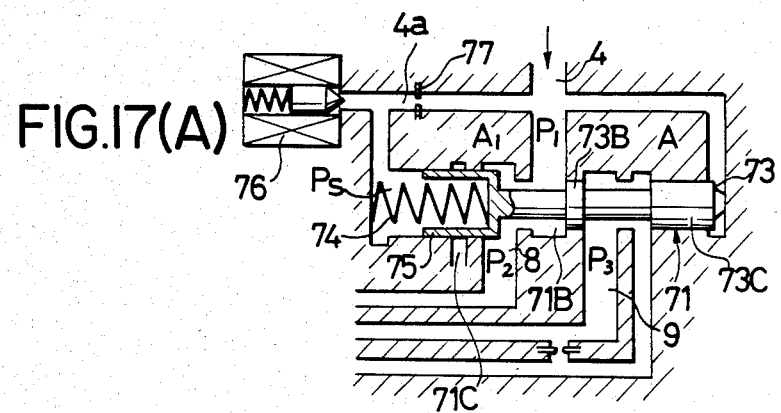
FIGS. 17A, 17B, 17C and 17D are views explaining the operation of the lock-up control valve employed in a third embodiment.
Figure 17B:
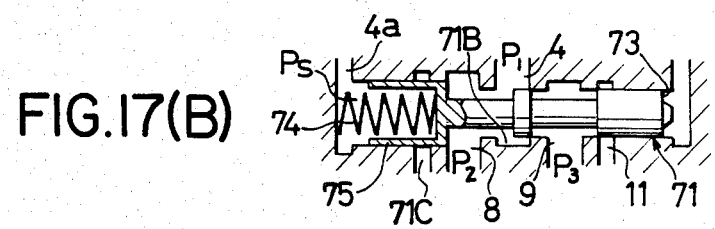
Figure 17C:
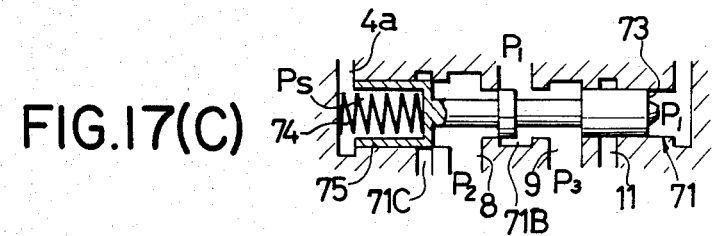
Figure 17D:
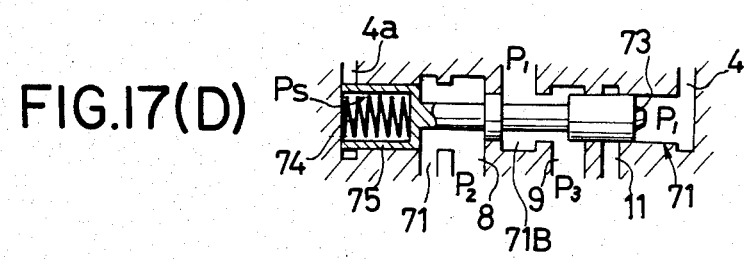

The manner of Controlling Lock-up Clutch Engagement:

Suppose that $P_1$: fluid coupling supply pressure in the passage 4, $P_2$: lock-up clutch releasing pressure in the passage 8, $P_3$: lock-up clutch engaging pressure in the passage 9, $P_S$: solenoid pressure in the passage 4a, $F_S$: resilient force of the spring 74 in the state of FIG. 17A, k: the spring constant of the spring 74, $A_1$: pressure receiving area of the sleeve 75, $A_2$: pressure receiving area of the land 73C, $\Delta X_1$: displacement of the valve from the position in FIG. 17A to that is FIG. 17B, $\Delta X_2$: displacement of the valve from the position in FIG. 17A to that in FIG. 17C, and $\Delta X_3$: displacement of the valve from the position in FIG. 17A to that in FIG. 17D.

(A) In the state of FIG. 17A, since the solenoid valve 76 is in OFF-position, $P_S = P_1 = P_2$, the force $F_1$ acting rightward, in the drawing, on the spool is: $F_1 = F_S + P_S \times A_1 = F_S + P_1 \times A_1$, the force $F_2$ acting leftward, in the drawing, on the spool is: $F_2 = P_1 \times A_2 + P_2 \times (A_1 - A_2) = P_1 \times A_1$, so that $F_1 = F_S + P_1 \times A_1 > P_1 \times A_1 = F_2$. Since the flow resistance of the cooler side passage 11 is small, $P_S > P_3$, so that the lock-up clutch remains released.

(B) In the state of FIG. 17B, the solenoid valve 76 is in duty operation and $P_1 = P_2$, $F_1 = F_S + \Delta X_1 \times k + P_S \times A_1$ and $F_2 = P_1 \times A_2 + P_2 \times (A_1 - A_2) = P_1 \times A_1$, so that $F_S + \Delta X_1 \times k + P_S \times A_1 = P_1 \times A_1$. In this state $P_S = P_1 - (F_S + \Delta X_1 \times k)/A_1$. Then, the lock-up clutch engaging pressure $P_3$ and the supply pressure $P_1$ are equilibrated.

(C) In the state of FIG. 17C, the solenoid valve 76 is under duty control and hence $P_1 = P_3$. Therefore, $F_1 = F_S + \Delta X_2 \times k + P_S \times A_1$, $F_2 = P_1 \times A_2 + P_2 \times (A_1 - A_2)$, so that $P_S = (F_S + \Delta X_2 \times k + P_S \times A_1 - P_1 \times A_2)/(A_1 - A_2)$. In this state, the value of $P_2$ varies within $P_1$ to 0 depending on the magnitude of $P_S$.

(a) When $P_2 = P_1$, $F_S + \Delta X_2 \times k + P_S 21 \times A_1 = P_1 A_1$, so that $P_S 21 = P_1 - (F_S + \Delta X_2 \times k)/A_1$.

(b) When $P_2 = 0$, $F_S + X_2 \times k + P_S 22 \times A_1 = P_1 \times A_2$, so that $P_S 22 = A_2/A_1 \times P_1 - (F_S + \Delta X_2 \times k)/A_1$.

(c) Since $A_2 < A_1$, $P_S 22$  $P_S 21$, $P_S 2w = P_S 21 - P_S 22 = (1 - A_2/A_1) \times P_1$. Therefore, during $P_S 2w$ in which the solenoid pressure $P_S$ drops from $P_S 21$ to $P_S 22$, the pressure $P_S$ can be reduced from $P_1$ to 0.

Figure 12:
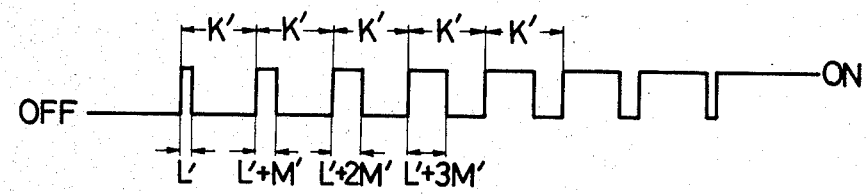
FIG. 12 is a waveform chart of duty control.
Figure 13:
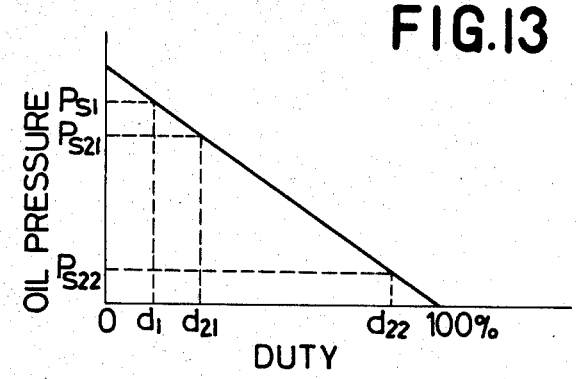
FIG. 13 is a graph showing the characteristics of the solenoid pressure $P_S$.
Figure 14:
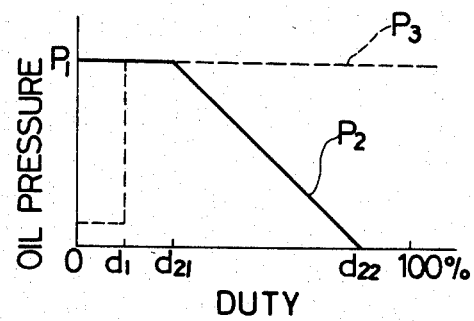
FIG. 14 is a graph showing the characteristics of the releasing pressure $P_2$ and of the engaging pressure $P_3$ which are applied to the lock-up clutch.
Figure 15A:
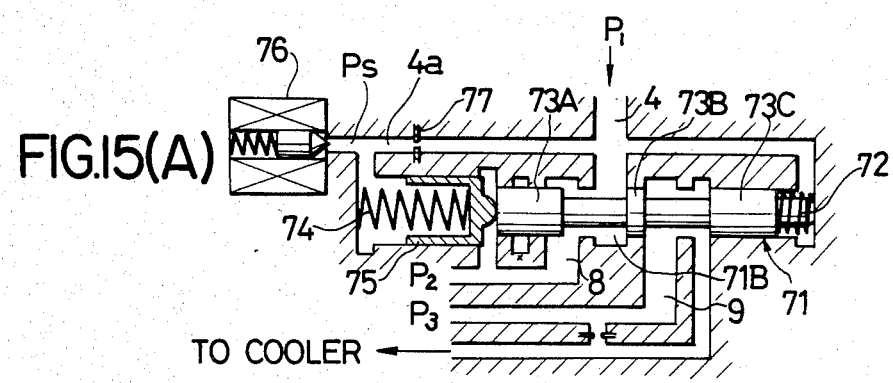
FIGS. 15A, 15B, 15C and 15D are views explaining the operation of the lock-up control valve employed in a first embodiment.
Figure 15B:
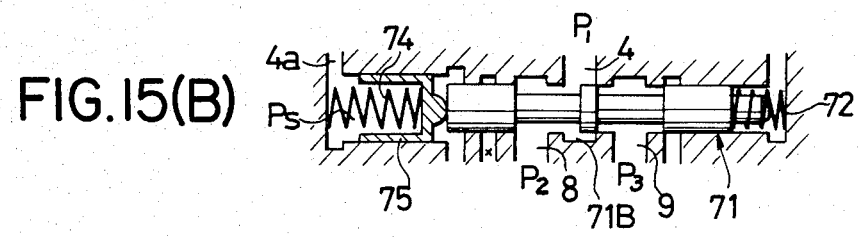
Figure 15C:
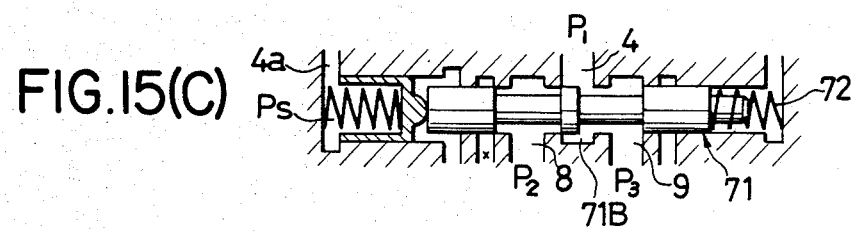
Figure 15D:
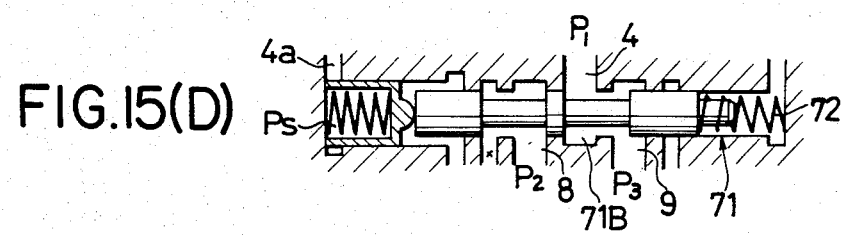
Figure 16A:
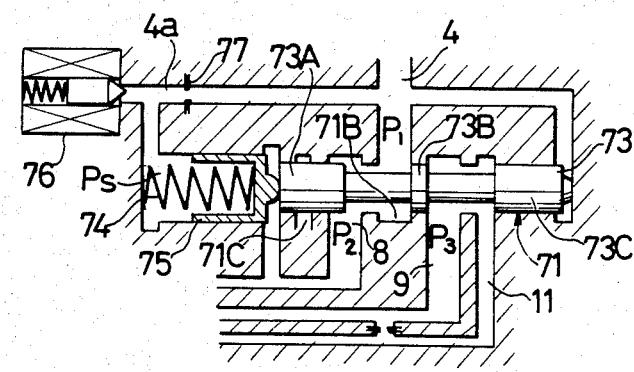
FIGS. 16A, 16B, 16C and 16D are views explaining the operation of the lock-up control valve employed in a second embodiment.
Figure 16B:
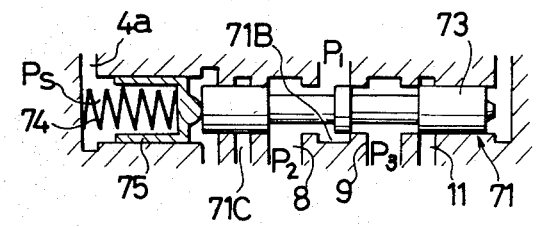
Figure 16C:
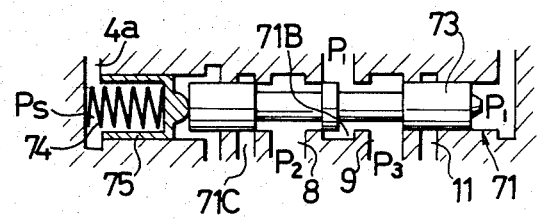
Figure 16D:
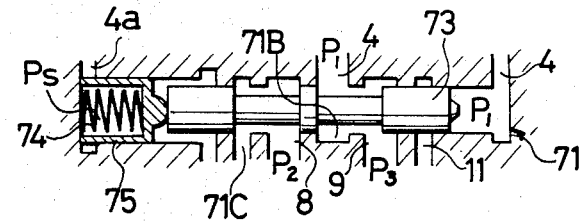

(D) In the state of FIG. 17D, since the solenoid valve 76 is in ON-position, $P_S = 0$, $P_3 = P_1$, $P_2 = 0$, $F_1 = F_S + \Delta X_3 \times k$ and $F_2 = P_1 \times A_2$, so that $F_S$, k, $P_1$ and $A_1$ are designed to provide $F_1 < F_2$. The present invention is similar to prior art in respect of the lock-up clutch being released with the solenoid valve 76 in OFF-position and the lock-up clutch being engaged with the solenoid valve 76 in ON-position. However, according to the present invention, the solenoid valve is not merely placed in OFF-position or in ON-position to engage or to release the lock-up clutch, but the solenoid valve is placed in OFF-position - duty increase - ON-position to regulate the engagement of the lock-up clutch. In controlling the lock-up clutch from released state to engaged state, a solenoid pressure $P_S$ of characteristics shown in FIG. 13 is created in the solenoid oil passage 4a by providing a periodic signal of incremental duration periods as shown in FIG. 12 for the solenoid valve 76. The spool 73 is controlled by the solenoid pressure $P_S$, so that the releasing pressure $P_2$ in the lock-up clutch releasing passage 8 and the supply pressure $P_3$ in the lock-up clutch engaging passage 9 vary as shown in FIG. 14 relatively to the solenoid duty. When the duty is within a range of 0% ($P_S=P_1$) to d1% ($P_S=P_{S1}$), the valve is controlled in a state between the state of FIG. 17A and that of FIG. 17B.

When the duty is within a range of d1% ($P_S=P_S1$) to d21% ($P_S=P_S21$), the valve is controlled in a state between the state of FIG. 17B and that of FIG. 17C. When the duty is within a range of d21% ($P_S=P_S21$) to d22% ($P_S=P_S22$), the valve is controlled in a state between the state of FIG. 17C and that of FIG. 17D. When the duty is within a range of d22% ($P_S=P_S22$) to 100% ($P_S=0$), the state of FIG. 17D is established.

In the lock-up control valve 71 employed in the second embodiment shown in FIG. 16, the spool is divided into two members. Although a highly precise concentricity between the valve and the sleeve is required of the lock-up control valve employed in the third embodiment due to the difference in diameter between the valve and the sleeve, problems arising from requirement for precise concentricity is solved by dividing the spool into two members as in the second embodiment. In the lock-up control valve 71 employed in the first embodiment as shown in FIG. 15, a spring is disposed on each side of the spool. Such a constitution increases the degree of freedom of the springs and facilitates the design.

In the respective lock-up control valves 71 shown in FIGS. 15, 16 and 17, employed in the first, second and third embodiments, respectively, of the present invention, the axial width of the port 71B is formed larger than that of the intermediate land 73B to allow the passage 4 to be connected temporarily both to the passage 8 and to the passage 9 so that temporal and simultaneous blocking of the passages 8 and 9 from the passage 4, which occurs in the conventional lock-up control valve as shown in FIG. 18, is prevented in order to maintain the pressure of the working fluid in the fluid coupling at a high level and to prevent cavitation and to attain further smooth change between oil passages under duty control.

The functions of the reduction ratio control mechanism 80 will be described hereinafter with reference to FIG. 19.

Figure 19A:
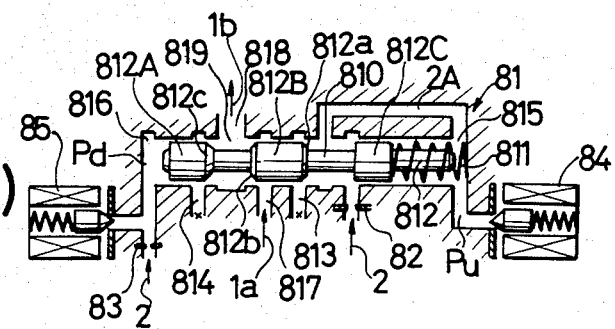
FIGS. 19A, 19B and 19C are views explaining the operation of the reduction ratio control mechanism.

Constant Speed Running:

As shown in FIG. 19, the solenoid valves 84 and 85 are in OFF-position. Then, the oil pressure Pd in the oil chamber 816 is in equilibrium with the line pressure. The oil pressure Pu in the oil chamber 815 also is in equilibrium with the line pressure while the spool 812 is at the right end position. Consequently, the spool 812 is moved toward the left end position by the resilient force of the spring 811. As the spool 812 is moved to the left, the oil chamber 815 is connected to the drain port 813 via the oil passage 2A and the oil chamber 810, so that the pressure Pu is exhausted, then, the spool 812 is moved to the right end position by the agency of the oil pressure Pd in the oil chamber 816. As the spool 812 is moved to the right, the drain port 813 is blocked. Accordingly, if the edge of the land 812B of the spool 812 on the side of the drain port 813 is tapered to form a taper surface 812a, the spool 812 can be retained more steadily at an intermediate position of equilibirum as shown in FIG. 19A.

With the spool retained at the intermediate position of equilibrium as shown in FIG. 19A, the oil passage 1a is closed and the oil contained in the hydraulic servomotor 530 of the input pulley 520 is compressed by the line pressure prevailing within the hydraulic servomotor 570 of the output pulley 560 through the V-belt 112 (FIG. 1a). Consequently, the oil pressure within the hydraulic servomotor 530 and that within the hydraulic servomotor 570 are equilibrated. Practically, since the oil leaks from the passage 1b, the input pulley 520 is expanded gradually and thereby the torque ratio T tends to increase. Accordingly, as shown in FIG. 19A, the leak from the passage 1b is supplemented by tapering the edge of the land 812B of the spool 812 on the side of the port 817 to form a taper surface 812b so that the drain port 814 is blocked while the port connected to the passage 1a is partly open with the spool 812 at the equilibrated position. Furthermore, smooth transient pressure rise in the passage 1b during pressure variation is attained by forming a taper surface in the edge of the land 812A on the side of the drain port 814. In this case, the working fluid of the line pressure is drained only from the drain port 813 via the orifice 82 and no other leak occurs.

Figure 19B:
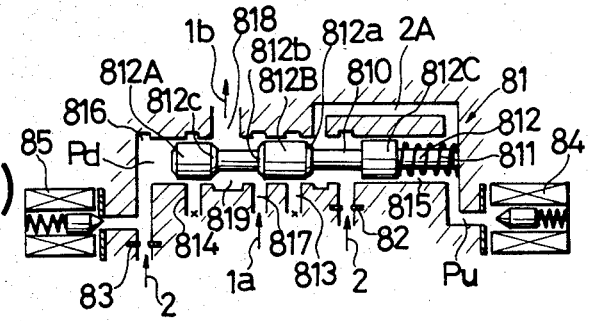

Upshift Operation:

As shown in FIG. 19B, the upshift solenoid valve 84 is placed in ON-position to drain the oil chamber 815. Then, the spool 812 is moved to the right compressing the spring 811 and is placed finally at the right end position as shown in FIG. 19B.

In this state, since the line pressure in the passage 1a is supplied to the passage 1b through the port 818, the oil pressure within the hydraulic servomotor 530 rises, whereby the movable flange 520B of the input pulley 520 is moved toward the corresponding fixed flange 520A to reduce the torque ratio T. Thus, the torque ratio is reduced to a desired value by appropriately controlling the duration of ON-position of the solenoid valve 84 for upshift operation.

Figure 19C:
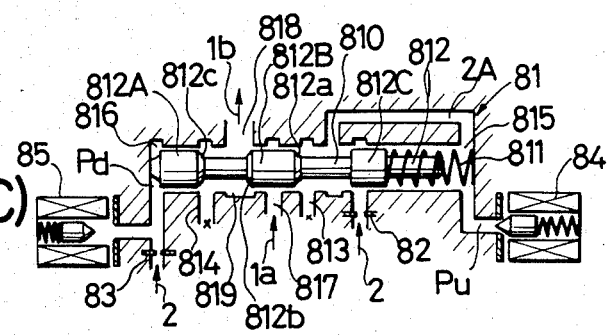

Downshift Operation:

As shown in FIG. 19C, the downshift solenoid valve 85 is placed in ON-position to drain the oil chamber 816. Then, the spool 812 is moved quickly to the left by the agency of the resilient force of the spring 811 and the line pressure working within the oil chamber 815, whereby the passage 1b is connected to the drain port 814. Consequently, the hydraulic servomotor 530 is drained and then the movable flange 520B of the input pulley 520 is moved quickly away from the corresponding fixed flange 520A, so that the torque ratio is increased. Thus, the torque ratio is increased by appropriately controlling the duration of ON-position of the solenoid valve 85 for downshift operation.

Figure 20:
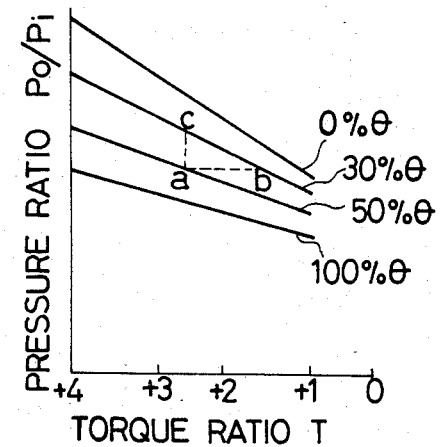
FIG. 20 is a graph for facilitating the explanation of the operation of the reduction ratio control mechanism.

Thus the output pressure of the reduction ratio control valve 81 is supplied to the hydraulic servomotor 530 of the input pulley (driving pulley) 520, while the line pressure is supplied directly to the hydraulic servomotor 570 of the output pulley (driven pulley) 560 through the passage 1. Suppose that the oil pressure in the hydraulic servomotor 530 of the input pulley is $P_i$ and the oil pressure in the hydraulic servomotor 570 of the output pulley 560 is $P_o$, the ratio $P_o/P_i$ varies with torque ratio T as shown in FIG. 20. When the accelerator is released to some extent to make the degree of throttle opening $\theta=30\%$ while the vehicle is running with the degree of throttle opening $\theta=50\%$ and the torque ratio T=1.5 (plot a), the operating mode of the transmission is changed to a mode indicated by plot b, where the torque ratio $T=0.87$, when the pressure ratio $P_o/P_i$ is kept unchanged, whereas the pressure ratio $P_o/P_i$ is increased by the output of the reduction ratio control mechanism 80 controlling the input pulley to change the mode of operation to a mode indicated by plot c when the torque ratio T is kept at 1.5. As described hereinbefore, an optional torque ratio can be established corresponding to every load condition through the appropriate control of the pressure ratio $P_o/P_i$.

As described in detail hereinbefore, the present invention provides an automatic transmission comprising, in combination, a belt drive continuously-variable speed transmission mechanism and a hydraulic control circuit. Since a throttle pressure lower than the line pressure is applied to two pressure chambers formed in the reduction ratio control valve of the hydraulic control circuit at both ends thereof axially of the spool, small and inexpensive solenoid valves are applicable to regulating the pressure within the pressure chambers.

What is claimed is:

1. An automatic transmission for a vehicle having an internal combustion engine with a throttle opening, comprising:
   a continusouly-variable speed transmision mechanism including an input shaft, an output shaft, an input variable-pitch pulley having a fixed pulley flange fixed concentrically to said input shaft and a movable pulley flange mounted concentrically with and axially slidably on said input shaft, an output variable-pitch pulley having a fixed pulley flange fixed concentrically to said output shaft and a movable pulley flange mounted concentrically with and axially slidably on said output shaft, and endless belt interconnecting said input and said output variable-pitch pulleys and hydraulic servomotors provided for said input and said output variable-pitch pulleys respectively for pressing the corresponding movable pulley flanges toward the corresponding fixed pulley flanges; and
   a hydraulic control circuit including a pressure generating source, regulator valve means to control the fluid pressure of said pressure generating source and adapted to generate a line pressure corresponding to pressure signals fed thereto, throttle pressure valve means to control said line pressure and adapted to generate a pressure corresponding to the throttle opening of the internal-combustion engine which has a predetermined value, when the throttle opening is zero, and to feed the pressure to said regulator valve means as a throttle pressure signal, ratio detecting valve means formed in said output shaft to control said line pressure and adapted to generate a pressure corresponding to an axial displacement of said movable pulley flange of said output variable-pitch pulley mounted on one of said shafts and to feed the pressure to said regulator valve means as a reduction ratio pressure signal, means to supply pressurized fluid at the line pressure to the hydraulic servomotor provided for said output variable-pitch pulley, reduction ratio control valve means provided with an axially slidable spool and two pressure chambers formed therein at both axial ends of the spool and adapted to selectively control the supply of said line pressure to the hydraulic servomotor of said input variable-pitch pulley through the movement of said spool and having fluid passages connecting said two pressure chambers of said reduction ratio control valve means, respectively, to the output side of said throttle pressure valve means and two solenoid valves for individually regulating the respective pressures in said pressure chambers.

2. An automatic transmission according to claim 1, wherein said throttle pressure valve means includes valve means to control the pressurized fluid at the line pressure supplied thereto from said regulator valve means in order to generate a first throttle pressure corresponding to the throttle opening and valve means to generate a second throttle pressrue which is equivalent to the reduction ratio pressure provided by said ratio detecting valve means when the throttle opening exceeds a predetermined degree.

3. The automatic transmission of claim 1 wherein the throttle pressure valve generates a pressure corresponding to a throttle opening of the internal-combustion engine which has a value greater than zero when the throttle opening is zero.

* * * * *